United States Patent [19]

Cook

[11] 4,031,845

[45] June 28, 1977

[54] SLIT NOZZLE SOUND SIGNAL GENERATOR

[75] Inventor: Edward J. Cook, South Hamilton, Mass.

[73] Assignee: Safety Research & Engineering Corporation, North Reading, Mass.

[22] Filed: Apr. 29, 1976

[21] Appl. No.: 681,537

[52] U.S. Cl. .......................... 116/34 R; 116/137 R
[51] Int. Cl.[2] .................. B60C 23/02; G10K 10/00
[58] Field of Search ......... 116/137 R, 137 A, 34 R; 46/179; 340/58, 404, 406

[56] References Cited

UNITED STATES PATENTS

| 1,298,538 | 3/1919 | Meyer et al. | 116/34 R |
| 1,954,688 | 4/1934 | Van Hees | 46/179 |
| 2,153,500 | 4/1939 | Eaves | 116/137 A |
| 2,697,999 | 12/1954 | Crookston et al. | 116/34 R |
| 3,225,784 | 12/1965 | Call | 116/34 R X |

FOREIGN PATENTS OR APPLICATIONS

| 1,269,469 | 9/1960 | France | 116/137 R |

Primary Examiner—Richard C. Queisser
Assistant Examiner—Daniel M. Yasich
Attorney, Agent, or Firm—Morse, Altman, Oates & Bello

[57] ABSTRACT

A gas-actuated sound signal generator is provided to produce a simple, reliable sound signal of predetermined frequency, or combination of frequencies. The signal generator is intended for use primarily with a tire pressure sensing system on a vehicle as a means for transmitting the occurrence of a low tire pressure condition from a wheel to a microphone mounted in fixed position to the vehicle and connected via processing circuitry to an alarm near the operator. The device is operated upon the release of a small amount of air from the tire if the tire pressure drops, for example, below a preset limit. The air released from the tire flows into the signal generator and is converted into a sound signal for detection by the microphone. The signal generator is comprised of a cavity block, a shim and a cover. The block contains an entrance feed through which air is admitted as from the tire and a cavity spaced from the entrance feed. The shim is slotted and overlaid on the block with the slot extending between the cavity and the entrance feed. The cover is formed with a port which registers with the cavity and, when placed over the shim, defines a communicating slit nozzle between the cavity and the entrance feed, as well as a port communicating with the cavity through which the signal is emitted. Air under pressure entering into the cavity strikes an edge of the shim and oscillations are produced.

12 Claims, 10 Drawing Figures

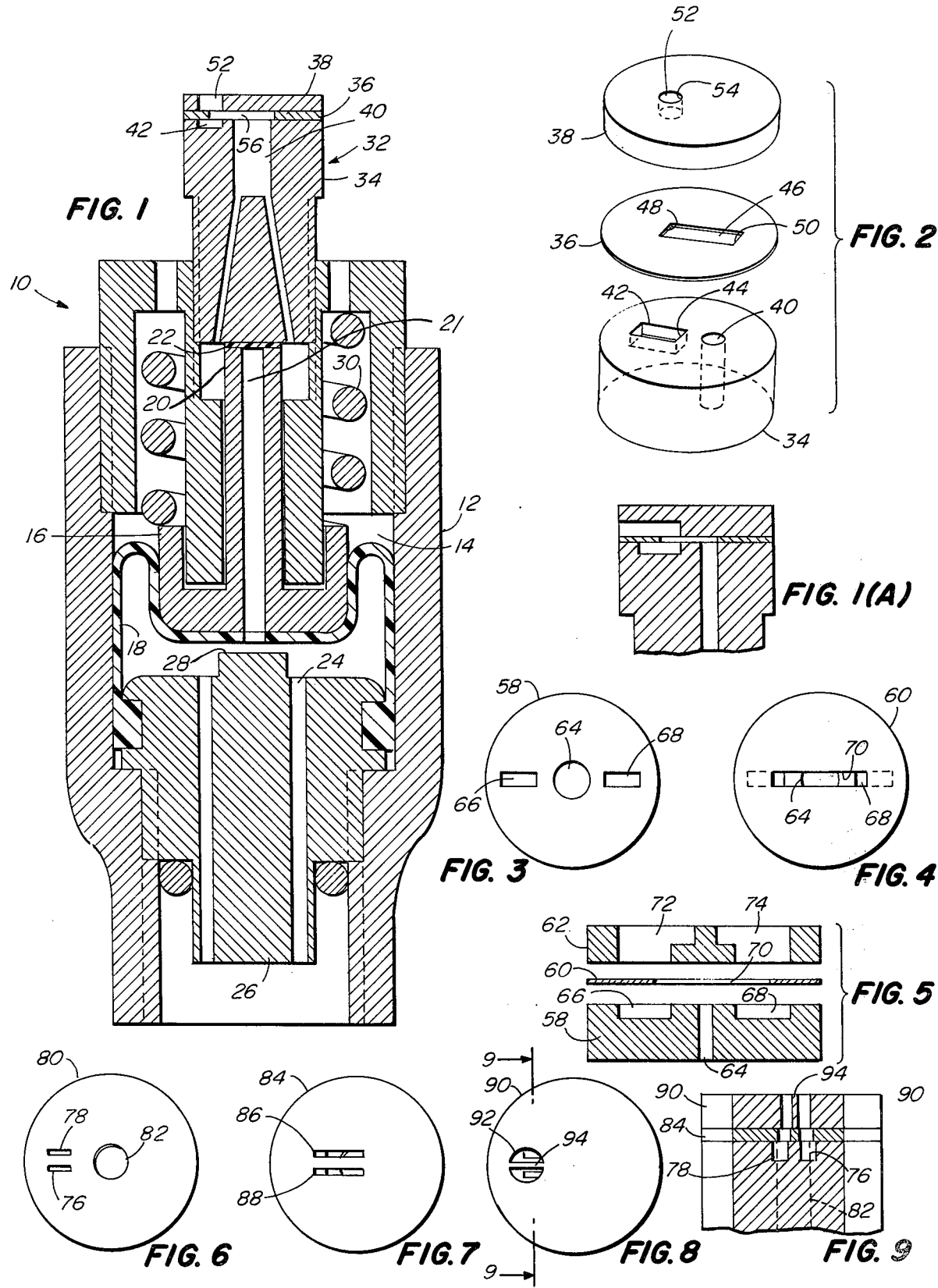

SLIT NOZZLE SOUND SIGNAL GENERATOR

BACKGROUND OF THE INVENTION

1. Field of the Invention

This invention relates generally to sound signal generators and more particularly is directed towards a new and improved gas-actuated sound signal generator that is particularly useful in connection with tire pressure sensing systems.

2. Description of the Prior Art

It is known that the pressure of a pneumatic tire may be monitored for either low or high pressure conditions by means of a device mounted to the wheel and adapted to generate a sound signal upon the occurrence of a high or low pressure event. The sound signal is then detected by a transducer forming part of a processing system for actuating an alarm device to alert the driver of the vehicle. By way of example, U.S. Pat. Nos. 3,489,998; 3,738,308; 3,890,595 and 3,934,223 show systems of this type. Also in co-pending application Ser. No. 665,889, filed by William A. Borabino Mar. 11, 1976, entitled "Method and Apparatus for Monitoring Tire Pressure," and assigned to the same assignee as the present application, there is disclosed a system of the same general sort in which the system is protected against actuation by false signals from background noise rather than true signals from the wheel mounted devices. In the co-pending application, this protection is achieved by the use of coded signals produced by two discrete frequencies generated by the wheel mounted device, resulting in amplitude modulation of the carrier with the signal being detected and decoded through processing circuitary.

In prior art devices, the sound signal generators have presented production difficulties from the standpoint of reproducibility, variation in performance, time needed to adjust individual devices and other factors.

Accordingly, it is an object of the present invention to provide a simple, low-cost sound signal generator which is easy to fabricate and assemble, requires no adjustment and provides inherently repeatable performance. Another object of this invention is to provide a highly efficient sound signal generator of highly stable performance and one which may be fabricated to emit multiple discrete frequencies for coding purposes.

SUMMARY OF THE INVENTION

This invention features a sound signal generator for use with tire pressure monitoring systems and the like, comprising a block, a shim and a cover, the block being formed with a feed passage through which the exciting gas is admitted from a tire pressure responsive device. The block is also formed with a cavity in one surface of the block spaced from the exit of the feed passage. The shim is slotted and of such a length that, when placed over the block and aligned with the cavity and the feed passage, one narrow edge of the shim will be positioned medially of the cavity while the other end extends over the entrance feed. The cover is formed with a cooperating port which registers with the block cavity and, when in position, defines with the shim a slit nozzle passage between the cavity and the feed passage and also an oscillating chamber. The cover port communicates with the oscillating cavity and provides a passage through which the generated signal is emitted. Multiple cavities and passages may be provided with appropriately slit shims to produce multiple frequencies from the same device.

BRIEF DESCRIPTION OF THE DRAWINGS

FIG. 1 is a sectional view in side elevation of a tire pressure signaling device made according to the invention.

FIG. 1a is a detail view similar to FIG. 1 but shown in a modification thereof,

FIG. 2 is an exploded perspective view of the signal generator portion of the FIG. 1 device, FIG. 3 is a top plan view of a modified block portion of the generator made according to the invention, FIG. 4 is a view similar to FIG. 3 but showing the shim in place, FIG. 5 is an exploded sectional view in side elevation of the FIGS. 3 and 4 modification, FIG. 6 is a top plan view of another modified block made according to the invention, FIG. 7 is a view similar to FIG. 6 but showing the shim in place, FIG. 8 is a view similar to FIG. 6 but showing a cover in place on top of the shim, and FIG. 9 is a cross sectional view taken along the line 9—9 of FIG. 8.

DETAILED DESCRIPTION OF THE PREFERRED EMBODIMENTS

Referring now to the drawings and to FIG. 1 in particular, there is illustrated a tire pressure signaling device 10, one of which is mounted to each wheel of a vehicle to form part of a tire pressure monitoring system of the sort disclosed in the foregoing patents and foregoing application. The device 10 is designed to be mounted to a wheel of a vehicle carrying a pneumatic tire and may be attached either to the air filling stem of the tire or may be separately mounted through the wheel to communicate directly with the interior of the tire. In either event, the device 10 includes a housing 12 having an internal cylindrical chamber 14 in which is mounted a piston 16 connected to the walls of the cylinder by means of a rolling seal diaphragm 18. The piston 16 is provided with a hollow stem 20 forming a passage 21, the upper end of which stem seats against a pad 22 and is the normal operating position of the device. The lower end of the device communicates with the interior of the tire through passages 24 formed in a plug 26 on either side of a valve seat 28 at the lower end of the cylinder opposite the lower end of the piston passage. A coil spring 30 engages the piston and has a selected force such that the piston will remain raised in the illustrated position as long as the pressure within the tire is above a minimum operating range. In the event that there is a reduction of tire pressure below a preset level, the spring will force the piston down, opening up the top of the stem passage 21 and releasing air to a slit nozzle sound signal generator 32 at the top of the device. As the pressure drops, the piston will also drop until it closes against the seat 26, thereby stopping any further flow of air through the device and also stopping the emission of sound signals from the generator 32.

The term sound, as employed herein, is intended to be used in the generic sense to encompass sound signals of any frequency from infrasonic and audio through ultrasonic and hypersonic. In practice, it has been found that the best results have been obtained wherein the device is designed to generate signals in the ultrasonic range.

The slit nozzle generator, according to this invention, in its simplest form is comprised of three elements as best shown in FIG. 2. These elements include a cavity block 34, a shim 36 and a cover 38. The cavity block is formed with an entrance feed passage 40 through which the exciting gas, i.e. air, is admitted upon actuation of the tire pressure device 10. In the illustrated embodiment, the passage 40 extends from top to bottom of the block 34, the upper end thereof terminating in the upper face adjacent to a rectangular cavity 42 formed in the top surface of the block. The dimensions of the cavity are typically 0.1 $\lambda_0$ wide, 0.1 $\lambda_0$ deep and 0.33 $\lambda_0$ long, where $\lambda_0$ is the desired acoustic output wave length. The cavity is positioned so that its center line in the long direction will intersect the axis of the entrance feed 40 so that its closest edge 44 will be at least five times the shim thickness from the exit port of the passage 40.

The shim 36 in the preferred embodiment is a thin piece of sheet stock, preferably on the order of 0.004 inches thick, and in which is formed a rectangular opening 46, 0.1 $\lambda_0$ wide. The length of the opening 46 is such that when the shim k is superimposed over the top surface of the block 34 and the opening aligned with the cavity 42, one narrow edge 48 of the shim opening 46 will lie close to the middle of the cavity 42 while an opposite shim edge 50 extends past the exit port of the feed passage 40.

Mounted on top of the shim 36 is the cover 38. The parts may be assembled by any known means such as screws, bonding techniques or the like. The cover 38 is formed with a port 52 extending entirely through the cover from top to bottom. Alternatively, the port may be vented radially out to the side of the cover as shown in FIG. 1 (a). The port in FIG. 2 corresponds generally in outline with the cavity 42. The port 52 is so positioned that when the cover is in place an edge 54 will align with the edge 44 of the cavity which is the edge closest to the exit port of the feed passage while the remainder of the cover must overlap that portion of the rectangular slot opening 46 in the shim which extends in the direction of the exit port of the feed passage 40. With the parts assembled as shown in FIG. 1, the shim 36 defines a slit nozzle passage 56 between the bottom face of the cover 38 and the top face of the block 34 to allow gas to flow from the entrance feed 40 to the cavity 42. At the same time the shim provides the interaction edge 48 which forms part of the signal generator in that oscillations are produced by the acoustically reinforced fluctuations of the gas stream around this edge. Further, the shim provides one wall of the acoustic cavity.

The generator operates in the following manner. Assuming that pressure in the tire to which the device is mounted drops below a preset limit, and as a result a flow of air is released for a short period of time by reason of the piston 16 first opening the top of the stem 20 from the pad 22, and then closing against the value seat 26. During this short time period while air is being released, the air will flow up through the passage 40 of the block 34, through the slit nozzle channel 56 and against the edge 48. Typically, the channel 56, which is the slit nozzle, is 0.004 inches high by 0.1 $\lambda_0$ wide and directs the gas flowing through it to impact on the far edge 48 of the rectangular hole 46 in the shim 36. Oscillations are produced by the acoustically reinforced fluctuations of the gas stream around this edge.

Since the shim simultaneously forms the slit nozzle, one wall of the acoustic cavity and the gas stream interaction edge, all critical alignments required for generator operation are automatically provided. The only assembly technique which must be carefully observed is to keep all mating surfaces flat and smooth, and, in particular, the surfaces which comprise the slit nozzle should be polished to a finish on the order of 8microinches or better to avoid turbulence in the injected air stream.

In the illustrated embodiment, particularly in FIG. 1, the dimensions of the components, particularly the shim, are exaggerated for purposes of illustration.

The simple sound generator, as described above, exhibits a large "pushing figure", i.e., the wavelength of oscillation depends upon the gas velocity which can be equated to gas flow rate or nozzle pressure drop. At very low flow rates, oscillation will commence at about $\lambda_1 = 4\ L_1$, where $L_1$ is the length of the rectangular cavity 52. As the flow rate increases the wavelength will decrease towards a limiting value of $\lambda_2 = 4\ L_2$, where $L_2$ is the length of the cavity 52 covered by the shim 36. The precise choice of $L_1$ and $L_2$ will depend upon the preferred flow rate for achieving $\lambda_0$, but in practice the choice of $L_1 = 2\ L_2 = 0.33\ \lambda_0$ has been found to give good performance.

The high pushing figure of the simple slit nozzle generator is believed to be caused by a velocity-dependent variation in the effective position of the boundary around which the gas stream pulsates. At high velocity this boundary coincides with the far edge of the shim, but at low velocities moves out in front of this edge and ultimately almost reaches the front of the cavity.

A substantial stabilization of the acoustic output wavelength, and improvement in both the efficiency and flow range, over which good operation is obtained, can be realized by adding a second resonant element to the acoustic structure. This element is added by replacing the simple thin cover with a thick one in which the exhaust from the cavity can be tuned. FIGS. 1 and 2 show preferred configurations. The diameter of the tuned exit port 52 is not critical but has generally been made equal to $L_1$. The length of the exit port for best performance has been found to be very close to 0.25 $\lambda_0$ or alternatively 0.75 $\lambda_0$, with the latter providing the greatest degree of stabilization and the former the best performance in terms of efficiency, wide flow range operation, and a smooth change in frequency with flow.

Referring now to FIGS. 3 through 9, there are illustrated modifications of the invention and in these embodiments the generator is adapted to provide multiple acoustic sources employing a common entrance feed. These sources may all be tuned to the same wavelength for the generation of a single powerful acoustic signal or may be tuned to separate wavelengths for the purpose of producing a specific code or for compensating for wave length shifts resulting from the use of various exciting gases and/or flow and temperature changes.

Since multi-cavity generators of the sort shown in FIGS. 3 through 9 are all physically close, considerable interaction takes place, and there is a tendency for phase locking to occur where the locking range depends on the oscillator "Q" and the wavelength differences between the individual generators. Such phase locking may be used to provide a directed beam of energy where the beam direction, as in any phased array antenna, is controlled by the location of the multiple generator exit ports and the phase difference between generators. Multi-cavity generators may be operated on single wavelength phase lock modes with both on-axis and off-axis directed acoustic beams.

If multiple wavelength outputs are desired, then care must be taken to prevent phase locking and a decoupling system must be built into the cover. One preferred technique involves symmetry between the generator exit ports and uses an acoustic decoupler within each exit port. This approach is seen in the embodiments illustrated in FIGS. 3, 4 and 5. As shown in the drawings, the modified generator includes a block 58, a shim 60 and a cover 62, which are assembled in superimposed relation. The block 58 is provided with a feed passage 64 corresponding to the passage 40 of the principal embodiment, and in its upper face is formed with a pair of cavities 66 and 68 located on opposite sides of the passage 64. The shim 60 is formed with a single slot opening 70 dimensioned to span between the two cavities and the top of the passage 64. The cover 62 is formed with a pair of exit ports 72 and 74 adapted to register with the cavities 66 and 68, respectively, to form two acoustical generators which function simultaneously from the same gas feed. In FIG. 5 it will be seen that each exit port 72 and 74, which typically overall is 0.75 $\lambda_0$ long, is broken up into a 0.5 $\lambda_0$ length and a 0.25 $\lambda_0$ length, each with a different cross section and thus different characteristic impedances. The 0.5 $\lambda_0$ section provides substantial isolation, while the 0.25 $\lambda_0$ section improves the transition to free space.

Referring now to FIGS. 6 through 9, there is illustrated another multiple cavity modification of the invention, and in this embodiment parallel cavities 76 and 78 are formed side by side in a block 80 on one side of an entrance feed passage 82. A shim 84 is formed with a pair of slots 86 and 88 in parallel side-by-side relation adapted to extend from the passage 82 to approximately midway across the cavities 76 and 78, as best shown in FIG. 7. A cover 90 is formed with a single exit port 92 bisected by a wall 94 to define separate discharge ports, one for each cavity. By properly defining the dimensions of the slots in the shim, the cavities may be made to produce identical frequencies or different, discrete frequencies, as desired.

While the signal generator has been shown and described in connection with a tire pressure sensing system, it may also be used to advantage in other applications where a gas-actuated sound signal is generated for detection at a remote location.

Having thus described the invention, what I claim and desire to obtain by Letters Patent of the United States is:

1. A sound generator actuated by a flow of gas, comprising
   a. a block, a shim and a cover assembled in superimposed relation,
   b. said block being formed with a flat face and a passage terminating at said face in a port located inwardly from the edges of said face and adapted to be connected to a source of compressed gas,
   c. said block being formed with at least one cavity in said face located inwardly from the edges of said face and spaced from said port,
   d. said shim being formed with an elongated opening of a length adapted to extend between said port and said cavity when said shim is in position over said face,
   e. said shim being formed with an interaction edge at one end of said shim opening, said interaction edge extending transversely across the mid-portion of said cavity,
   f. said cover being formed with a flat face and at least one opening discharge vent in said face, said cover face adapted to span said shim opening when said cover is in position over said shim with said vent in communication with said cavity through said shim opening,
   g. said shim opening defining with the opposing flat faces of said block and cover a slit nozzle between said port and said cavity whereby gas delivered into said passage will flow through said nozzle and against said interaction edge to produce oscilations released through said vent.

2. A sound generator, according to claim 1, wherein said cavity is approximately 0.1 $\lambda_0$ wide, 0.1 $\lambda_0$ deep, and 0.33 $\lambda_0$ long where $\lambda_0$ is the desired acoustic output wavelength.

3. A sound generator, according to claim 2, wherein said shim opening is 0.1 $\lambda_0$ wide.

4. A sound generator, according to claim 1, wherein said cavity is spaced from said port by a distance at least 5 times the thickness of said shim.

5. A sound generator, according to claim 1, wherein said block is formed with a plurality of cavities and said cover is formed with a plurality of vents.

6. A sound generator, according to claim 5, wherein said cavities are of different sizes.

7. A sound generator, according to claim 5, wherein each of said vents is formed with different cross-sectional areas.

8. A sound generator, according to claim 7, wherein said vents are of different lengths.

9. A sound generator, according to claim 1, wherein said cover is relatively thick and the diameter of said vent is asymmetrical in cross-sectional area.

10. A sound generator, according to claim 1, in combination with a pressure responsive valve mountable to a pneumatic tire and adapted to release a quantity of pressurized gas to said generator through said block passage whenever the pressure in said tire exceeds a predetermined limit.

11. A sound generator, according to claim 1, wherein said cover vent extends from said cover face to the side of said cover.

12. A sound generator, according to claim 1, wherein said cover vent extends from said cover face to the top of said cover.

* * * * *